United States Patent [19]

Delmonico

[11] Patent Number: 4,623,390

[45] Date of Patent: Nov. 18, 1986

[54] INSULATING PAINT FOR INTERIOR AND EXTERIOR OF BUILDINGS AND METHOD OF MAKING SAME

[75] Inventor: John A. Delmonico, Arvada, Colo.

[73] Assignee: Old Western Paints, Inc., Denver, Colo.

[21] Appl. No.: 794,587

[22] Filed: Nov. 4, 1985

Related U.S. Application Data

[63] Continuation of Ser. No. 626,681, Jul. 2, 1984, abandoned.

[51] Int. Cl.$^4$ ................................................ C09D 5/14
[52] U.S. Cl. .......................... 106/15.05; 106/287.34; 252/62; 523/219
[58] Field of Search ..................... 252/62; 106/287.34, 106/15.05; 523/219

[56] References Cited

U.S. PATENT DOCUMENTS

| | | | |
|---|---|---|---|
| 3,620,791 | 11/1971 | Krupnick | 106/288 B |
| 3,968,060 | 7/1976 | Vincent et al. | 521/76 |
| 4,234,340 | 11/1980 | Pellico | 106/15.05 |
| 4,235,836 | 11/1980 | Wassell et al. | 252/62 |
| 4,263,345 | 4/1981 | Bingham | 523/219 |
| 4,277,355 | 7/1981 | Farcnik | 106/15.05 |
| 4,286,013 | 8/1981 | Daroga et al. | 428/268 |
| 4,307,142 | 12/1981 | Blitstein et al. | 428/143 |
| 4,385,135 | 5/1983 | Langer et al. | 106/122 |
| 4,388,424 | 6/1983 | Kennell et al. | 523/219 |
| 4,391,930 | 7/1983 | Olson | 523/219 |
| 4,425,291 | 1/1984 | Beer | 106/122 |
| 4,485,192 | 11/1984 | Gibbs et al. | 523/219 |
| 4,531,975 | 7/1985 | Salome | 106/18.3 |

FOREIGN PATENT DOCUMENTS 060652  4/1983  Japan ................................. 106/122

*Primary Examiner*—Theodore Morris
*Attorney, Agent, or Firm*—Gregg I. Anderson

[57] ABSTRACT

An insulating paint for exteriors or interiors of buildings includes glass microspheres or hollow glass extenders, having a density of about 0.22 to 0.28 grams per cubic centimeter, and a diameter of about 100 microns. The microspheres are dispersed by high speed mixing in the grind stage of the paint formulation. The paint provides insulation against heat loss.

11 Claims, No Drawings

INSULATING PAINT FOR INTERIOR AND EXTERIOR OF BUILDINGS AND METHOD OF MAKING SAME

This application is a continuation of Ser. No. 626,681, filed July 2, 1984, now abandoned.

BACKGROUND OF THE INVENTION

1. Field of the Invention

The present invention relates generally to exterior and interior building paints. The present invention more particularly relates to heat insulation of buildings by application of an insulating material to lower heating and cooling costs and enhance energy savings.

2. Brief Description of the Prior Art

Paint, in and of itself, has certain insulation characteristics when applied to the exterior or the interior of a building. However, it has not previously been known or suggested to incorporate insulation materials into paint to thereby produce an insulating paint. Hollow glass microspheres have been used in thermal insulating applications and as extenders in a variety of applications. The glass microspheres or extenders are suggested for application in epoxies, pastes, putties, adhesives, and sealants. Such extenders are particularly known and have been found useful to reduce weight while increasing the body or volume of plastic formed products.

Prior art patents are equally devoid of any reference to insulating paints for use in building heating and cooling applications. A paint insulation for an electrical conductor is shown in Japanese Patent No. 52-8486. The insulation is provided for use on an electrically conductive wire.

A fire resistant paint, manufactured by dispersing powdered glass and a powdered blowing agent through the paint, is shown in U.S. Pat. No. 3,630,764, to R. Shannon. At high temperatures, the dispersion agents are physically transformed into a layer of foamed glass which insulates the protected surface from the heat of the fire.

Hollow glass particles or microspheres are used to impart thermal insulation and fire resistance characteristics to a building panel in U.S. Pat. No. 4,235,836, to L. Wassel. The hollow glass particles are bonded with a refractory material by a binder.

U.S. Pat. No. 4,104,073, to W. Koide, et al., discloses the addition of glass microspheres or "microballoons" to putty in order to form a fire resistance seal. Microballoons are defined as fine, hollow particles of organic or inorganic material. The interior voids of the microballoons may be closed or open to the atmosphere.

Russian Pat. No. 717005 discloses a phosphate filler of spheroid shape for reducing the density of an insulating material. Hollow glass microspheres for sound insulation in a sheet-like material are shown in U.S. Pat. No. 4,079,162, to A. Metzger. U.S. Pat. No. 4,184,969, to B. Bhat, shows a fire resistant cellular fiber mixed with paint.

West German Pat. No. 1,921,559 shows a wallpaper paste that is adhered by heat and foams to effect sound and thermal insulation. An extrusion process for materials containing silica and alumina microspheres is shown in U.S. Pat. No. 4,273,806 to B.G. Sechler.

U.S. Pat. No. 3,968,060, to D. Vincent, shows micro capsules formed of a polymeric material. The capsules are of a small diameter of less than 5 microns and in one example, are incorporated in paint to give flame resistance and "hiding" power. Vincent shows a ratio of 0.1 to 1.0 pound of microcapsules per gallon of paint. The microcapsules are added to paint already formulated.

U.S. Pat. No. 4,286,013, to M. Daroga, et al., discloses a flame resistant barrier coating incorporating, by weight 20%–45% hollow glass microspheres. Daroga does state that the hollow glass microspheres are thermal insulators. Daroga would require a microsphere size of between 10 and 250 microns.

OBJECTS AND SUMMARY OF THE INVENTION

It is the principal object of the present invention to provide an insulating paint product having increased energy savings when the paint is applied to the exterior or interior of a building.

It is a related object of the present invention to provide an insulating paint of the foregoing character which is easily and cheaply manufactured from existing paint formulations and glass microspheres.

It is a further related object of the present invention to provide an improved method for the manufacture of insulating paint.

In accordance with the objects of the invention, a paint having insulation properties is formulated by the addition thereto of hollow glass extenders or microspheres. The paint formulation includes a known two-step mixing process. In the first or dispersion step, referred to as the grind stage or portion, surfactants or wetting agents, coalescing agents, defoamers, fillers, and the like, are added to a selected pigment and water. High speed rotational mixing of these various components results in a uniform dispersion of the components.

In a second stage or portion of the known mixing process, referred to as the letdown stage, additional materials are added including acrylic resins, additional water, buffers, defoamers and the like. The letdown stage is a simple mixing process, at a relatively lower speed of rotational mixing.

Paint formulations, including the well known additives and components referred to generally above, can vary widely. In the present invention, it is important to add hollow glass microspheres or extenders, of a particular diameter, to the formulation process. In order to obtain proper dispersion of the microspheres throughout the mixture, it is necessary that the microspheres be added as one of the last additives in the dispersion or grind stage of the process. It is also necessary that a particular weight portion or amount of microsphere material be added compared to the number of gallons of paint being manufactured in a given mix. This amount of microsphere material has been found to be between 0.5 and 0.75 but preferably about 0.75 pound of glass microspheres to one gallon of paint in the final formulation.

DESCRIPTION OF THE PREFERRED EMBODIMENTS

A paint and a paint formulation process are hereinafter disclosed which incorporate an insulation material in the form of glass microspheres, such as commercially available hollow glass extenders, resulting in the production of what is hereinafter referred to as an insulating paint product. The insulating paint is manufactured to a preferred predetermined ratio of 0.75 pound of glass microspheres to one gallon of paint in the final formulation.

Formulation of the insulating paint generally follows principles well known in the art of formulating and mixing paint. A dispersion step or grind stage is performed first. In this step, predetermined amounts of water, surfactants, coalescing agents, defoamers, pigments, and fillers, along with such other standard material additives as are used in paint formulations, are mixed at high speed in an appropriate mixer or mill.

At the end of the grind stage, glass microspheres are added to the grind formulation in an amount of between about 0.5 pound to about 0.75 pound per gallon of paint formulated, preferably 0.75 pounds per gallon, and thoroughly mixed. It has been found that below 0.5 pound glass microspheres per gallon of paint does not give the superior insulation results desired. More than 0.75 pound of glass microspheres per gallon of paint results in a mixture that is so thick and viscous that it cannot be adequately mixed or worked.

It is important that the microspheres be added at the end of the grind stage or they will not adequately disperse in the mixture. Failure to adequately disperse the microspheres results in a gritty, grainy paint having poor surface characteristics.

As mentioned previously, the proportion of microspheres to a given paint formulation, is also important. Too large a quantity of the microspheres results in a paint formulation which is so dense that it cannot be properly or thoroughly mixed. Too small an amount of the microspheres results in a paint which does not exhibit good heat transfer resistance characteristics so important in insulation.

One glass microsphere product that has been found particularly well suited for use in the manufacture of the insulating paint is sold under the name Extendospheres XOL-200, manufactured by P.A. Industries, Chattanooga, Tenn. The physical properties of the glass microspheres are seen in the following table:

| GLASS MICROSPHERE PROPERTIES | |
|---|---|
| PROPERTY | VALUE |
| Physical Form | Free Flowing Power |
| Color | White |
| Bulk Density | 7.5–9.0 lbs/ft$^3$ |
| Effective Specific Gravity | 0.22–0.28 gm/cc |
| Average Particle Size | 100 microns |
| Thermal Conductivity | 0.35 BTU in/hr ft$^2$ °F. |
| Softening Point | 1800° F. |
| pH, Water Suspension | 7.2 |
| Moisture Absorption, 24 Hrs, Wt % | 0.4% |
| Floaters, Minimum % by Volume | 90% |

It is believed that particle size can vary between 50 and 150 microns, but that 100 microns is preferable. It is correspondingly believed that particle density can vary to between 0.20 and 0.30 gm/cc.

The base paint to which the glass microspheres are added includes surfactants to wet the pigments and enhance mixability. The pigments can include Titanium Dioxide, a white pigment. Ethylene glycol, for example, is an additive used to prevent the paint from drying too quickly. Coalescing agents or film forming materials put a film on the paint as it dries. Defoamers, as are known to those in the art, keep bubbles down during manufacture and use of the paint. The foregoing additives or ingredients are conventionally added during the grind stage of the mixing operation.

Various additives are added during the letdown stage of the mixing operation, occurring at relatively slower rotational mixing speeds. Thickening agents and acrylic resins, which allow the paint to adhere to the painted surface of a building interior or exterior are added. Buffers are used to maintain the pH at a set value. Turpentine and other petroleum products are used as aromatic solvents to mask the odor the paint would otherwise have.

The preceding two step formulation process, is well known in the industry. In any given case the exact order of material additives and amounts may vary. In any event, there is always a grind stage and a letdown stage.

The following Example illustrates the present invention.

EXAMPLE

Water, surface active agents and pigments are mixed in a suitable mixing tank and mixed at 1800 RPM for about 15 minutes. The microspheres described in the preceding Table, in a ratio of 0.75 pounds per gallon of paint, are then added and agitation is continued at about 1500 RPM until the microspheres are completely and uniformly dispersed. The foregoing comprises the grind stage. The remaining ingredients, principally the latex resin vehicle, are added and stirring is continued in the letdown stage at a reduced speed of about 1000 RPM until all the ingredients are thoroughly mixed. The final few ingredients are added. The latex base insulating paint thus produced is placed into appropriate containers for subsequent use.

The percent of glass microspheres to the total additives, excluding water, by weight, is on the order of 6.5 to 8.5 percent. These weight percentages equate to 0.5 to 0.75 pounds of microspheres per gallon of paint.

Though the invention has been described with a certain degree of particularity, the scope of the invention is more particularly defined in the appended claims.

What is claimed is:

1. An insulating paint of the type including water, surfactants, coalescing agents, defoamers, pigments and fillers for application to interior and exterior building walls to enhance heat insulation characteristics thereof, comprising the admixture of a paint composition and microspheres having a density of about 0.22 to about 0.28 gm/cc and a diameter of about 100 microns, said microspheres being in the weight amount of about 0.75 pound per gallon of insulating paint.

2. An insulating paint of the type including water, surfactants, coalescing agents, defoamers, pigments and fillers for application to interior and exterior building walls to enhance heat insulation characteristics thereof, comprising the admixture of a paint composition and microspheres having a density of about 0.20 to about 0.30 gm/cc and a diameter of about 50 to about 150 microns, said microspheres being in the weight amount of between about 0.50 and about 0.75 pound per gallon of insulating paint.

3. A surface having an insulating coating therein of a paint composition as defined in claim 1.

4. A surface having an insulating coating therein of a paint composition as defined in claim 2.

5. An insulating paint of the type including water, surfactants, coalescing agents, defoamers, pigments and fillers manufactured by a predetermined formulation including a dispersion step wherein preselected materials in predetermined amounts are mixed at high speed until a dispersion is achieved, followed by relatively slower mixing step, a predetermined amount of hollow glass microspheres are added to the formulation as the last added material of the dispersion step.

6. The paint as defined in claim 5 wherein the hollow glass microspheres have the following properties:

| PROPERTY | VALUE |
| --- | --- |
| Physical Form | Free Flowing Power |
| Color | White |
| Bulk Density | 7.5-9.0 lbs/ft$^3$ |
| Effective Specific Gravity | 0.22-0.28 gm/cc |
| Average Particle Size | 100 microns |
| Thermal Conductivity | 0.35 BTU in/hr ft$^2$ °F. |
| Softening Point | 1800° F. |
| pH, Water Suspension | 7.2 |
| Moisture Absorption, 24 Hrs, Wt % | 0.4% |
| Floaters, Minimum % by Volume | 90% |

7. The paint as defined in claim 5 wherein the proportion of hollow glass microspheres to gallon of paint is 0.75 of a pound of microspheres to one gallon of paint.

8. A method of producing an insulating paint of the type including water, surfactants, coalescing agents, defoamers, pigments and fillers composition comprising the steps of preparing an initial grind mixture of the paint solvent, pigment and surface active agents, adding glass microspheres to said grind mixture and thoroughly dispersing said microspheres therein, adding to said grind and microspheres mixture the remaining paint ingredients including the resin vehicle, and thoroughly mixing said paint ingredients to form an insulating paint composition.

9. A method of producing an insulating paint of the type including water, surfactants, coalescing agents, defoamers, pigments and fillers composition comprising the steps of preparing an initial grind mixture of the paint solvent, pigment and surface active agents, adding glass microspheres, having a density of between about 0.22 and about 0.28 gm/cc and a diameter of about 100 microns, to said grind mixture in an amount of about 0.75 pound microspheres per gallon of insulating paint, and thoroughly dispersing said microspheres therein, adding to said grind and microspheres mixture the remaining paint ingredients including the resin vehicle, and thoroughly mixing said paint ingredients to form an insulating paint composition.

10. An insulating paint of the type including water, surfactants, coalescing agents, defoamers, pigments and fillers for application to interior and exterior building walls to enhance heat insulation characteristics thereof, comprising the admixture of a paint composition and microspheres having a density of about 0.22 to about 0.28 gram per cubic centimeter and a diameter of about 100 microns, said microspheres having a proportional weight of between 6.5 and 8.5%.

11. An insulating paint of the type including water, surfactants, coalescing agents, defoamers, pigments and fillers for application to interior and exterior building walls to enhance heat insulation characteristics thereof, comprising the admixture of a paint composition and microspheres having a density of about 0.2 to about 0.30 grams per cubic centimeter and a diameter of about 50 to about 150 microns, said microspheres having a proportional weight of between 6.5 and 8.5%.

* * * * *